Dec. 12, 1939.  A. E. DENTLER  2,182,917
SHOCK ABSORBER
Filed May 23, 1938
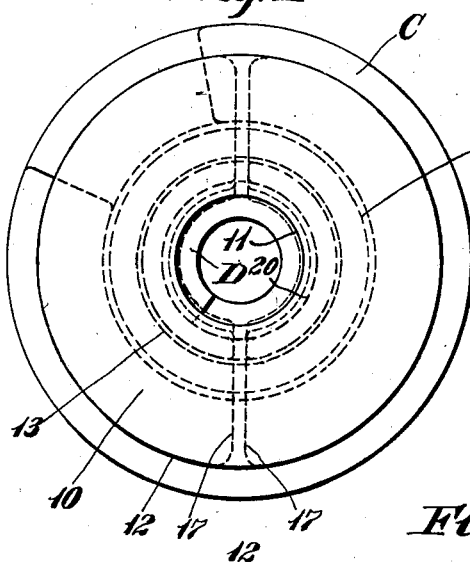
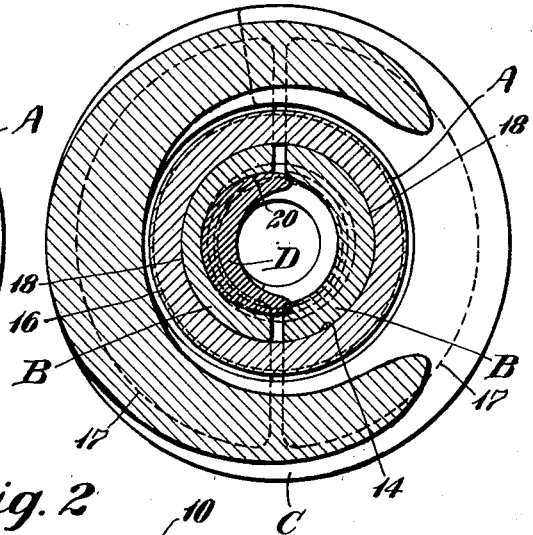
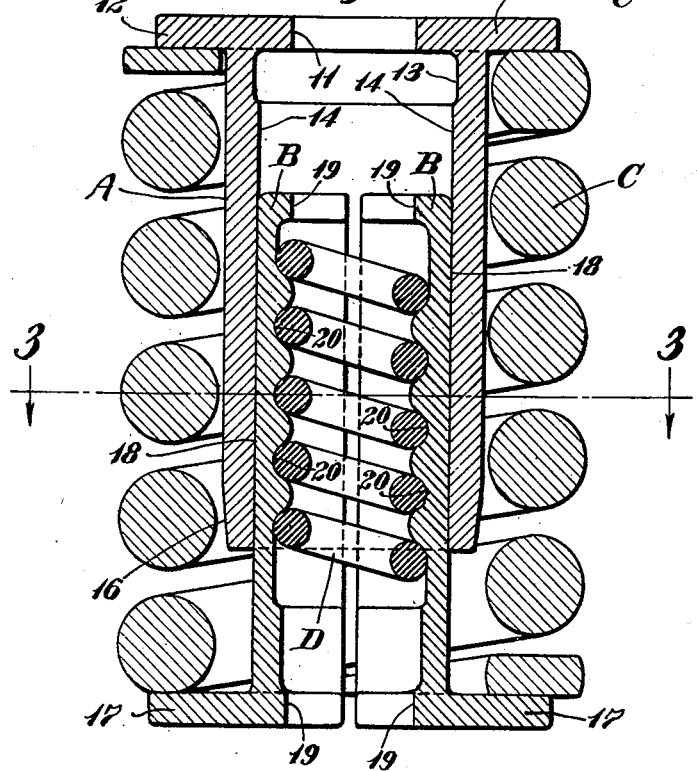
Inventor
Arnold E. Dentler
By Henry Fuchs
Atty.

Patented Dec. 12, 1939

2,182,917

UNITED STATES PATENT OFFICE 2,182,917

SHOCK ABSORBER

Arnold E. Dentler, Hinsdale, Ill., assignor to W. H. Miner, Inc., Chicago, Ill., a corporation of Delaware Application May 23, 1938, Serial No. 209,426

8 Claims. (Cl. 267—9)

This invention relates to improvements in shock absorbers, and more particularly to shock absorbers for use as snubbing devices in connection with truck springs of railway cars.

One object of the invention is to provide a shock absorber of simple design and efficient in performance, especially adapted for use as a snubber for dampening the action of truck springs of railway cars and replacing at least one of the coil springs of the usual set of springs employed in each cluster of such car trucks.

A more specific object of the invention is to provide a snubber of the character described in the preceding paragraph offering substantially uniform resistance throughout the action of the device, wherein the frictional resistance is produced by cooperating elements in sliding contact with each other and the pressure on said elements to provide friction therebetween is produced by a distorted helical spring member, the coils of which wedge one friction element against the other.

Other objects of the invention will more clearly appear from the description and claims hereinafter following.

In the drawing forming a part of this specification, Figure 1 is a top plan view of the improved shock absorber or snubbing device embodying my invention. Figure 2 is a transverse vertical sectional view of the device shown in Figure 1. Figure 3 is a horizontal sectional view, corresponding substantially to the line 3—3 of Figure 2.

As disclosed in said drawing, my improved snubbing device or shock absorber comprises broadly a friction casing A; a pair of friction shoes B—B telescoped within the casing; a relatively heavy spring C surrounding the casing and shoes; and a helical coil spring D embraced by the shoes and maintaining said shoes yieldingly pressed apart to hold the same in frictional contact with the interior of the casing.

The friction casing A is in the form of a substantially cylindrical tubular member open at the inner or bottom end and closed by a transverse end wall 10 at its outer or upper end, said wall being provided with a central opening 11. The top wall extends laterally outwardly beyond the body portion proper of the casing, providing an annular flange 12 which forms an abutment for the upper end of the coil spring C. The casing A is of enlarged internal diameter at its upper end, as indicated at 13, and the remaining section of the casing below said enlarged interior section provides transversely curved friction surfaces 14—14 with which the shoes B—B cooperate. At the open end, the casing A is exteriorly beveled, as indicated at 16, to facilitate assembling of the same within the spring C.

The friction shoes B—B are of similar design, each comprising a main body portion having a laterally, outwardly projecting, horizontal base flange 17 which serves as an abutment for the lower end of the spring C. The body portion of the shoe B is of generally curved cross section, as clearly shown in Figure 3 and presents an outer friction surface 18 corresponding in curvature to the interior friction surface 14 of the casing A and slidably engaging the same. The upper and lower ends of each shoe B are reenforced by interior, horizontally extending, short arcuate flanges 19—19. The main body portion of the shoe is thickened between its top and bottom ends, as clearly shown in Figure 2, and the interior surface of said thickened portion of the shoe is provided with a series of spaced grooves 20—20, each of which forms a part of a helix and which grooves together with the grooves of the other shoe define a continuous helix. The shoes B—B are telescoped within the casing A and are preferably diametrically opposite. Although two shoes are shown in the drawing, it is evident that a greater number may be employed.

The spring C surrounds the casing A and shoes B—B and has its top and bottom ends bearing respectively on the flange 12 of the casing A and the flanges 17—17 of the shoes B—B. This spring yieldingly opposes relative movement of the casing and shoes toward each other in a lengthwise direction.

The spring D is in the form of a helical coil and is disposed between the shoes B—B, having the outer sides of the coils thereof seated in the helical groove sections 20—20 formed in the shoes. This coil is distorted when assembled with the shoes, either through elongation or compression, so that the same is under tension or compression in completely assembled condition of the device, whereby the tendency of the coil to return to its initial overall length yieldingly presses the shoes apart due to wedging action between the coils thereof and the walls of the helical groove sections 20—20 of the shoes. The shoes are thus pressed into frictional engagement with the interior friction surfaces of the casing under pressure, which is substantially uniform throughout the action of the device, thus affording constant uniform frictional resistance to relative longitudinal movement of the casing A and the shoes B—B.

In assembling my improved shock absorber or snubber, the spring C is telescoped over the casing A, as shown in Figure 2, and the shoes B—B with the spring D therebetween are telescoped within the casing A. In assembling the shoes B—B with the spring D before telescoping the same within the casing A, the spring D is distorted as hereinbefore described, by either elongating or compressing the same and the shoes placed in embracing relation therewith, the outer sides of the coils of the spring D being seated in the helical groove sections 20—20 of the shoes.

As will be understood, my improved shock absorbing device when used as a snubber in connection with truck springs of railway cars takes the place of at least one of the usual spring units of each spring cluster of truck springs and is interposed between the truck bolster and spring plank of the truck in the same manner as the spring units. The number of snubbers employed in a spring cluster may be varied to suit conditions, it being evident that, when found desirable, two or more of such devices may be used in each spring cluster. Also a complete cluster of such snubbers may be substituted for the entire spring cluster of the truck.

In the operation of my improved snubber, upon the springs of the spring cluster of the truck of a railway car being compressed by relative approach of the truck bolster member and the spring plank member, the snubbing unit will also be compressed between these members and the friction shoes B—B forced inwardly of the casing A opposed by the spring C. Due to the friction existing between the friction shoes and the friction surfaces of the casing A, relative movement of these parts is frictionally opposed and the action of the springs of the cluster effectively snubbed. Oscillation of the springs of the cluster is thus reduced to a minimum by this snubbing action. When the coils of the truck spring cluster expand and the usual spring follower plates of the cluster are moved apart, the friction shoes B—B and the casing A will also be forced apart by the expansive action of the spring C which reacts against the flange 12 of the casing A and the flanges 17—17 of the shoes B—B. The parts will all thus be restored to the normal position shown in Figure 2.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing; of friction shoes telescoped within the casing and having contact with the interior wall of the latter; a helical spring coil embraced by said shoes, said shoes having wedge faces in engagement with the coils of said spring holding said spring against bodily movement in lengthwise direction with respect to said shoes; and spring means opposing relative longitudinal movement of the casing and shoes.

2. In a friction shock absorbing mechanism, the combination with a friction casing having interior friction surfaces; of friction shoes within said casing having longitudinal sliding contact with the friction surfaces of the casing, said shoes having interior helical groove sections; a lengthwise distorted helical spring between said shoes having the outer sides of its coils seated in said grooves; and spring means yieldingly opposing relative longitudinal movement of said casing and shoes.

3. In a friction shock absorbing mechanism, the combination with friction elements having relative longitudinal movement with respect to each other; of means for pressing said elements into tight frictional contact with each other comprising a lengthwise distorted helical spring having the coils thereof in wedging engagement with one of said elements and being held against lengthwise bodily movement with respect to the element with which it has wedging engagement, by said engagement; and means yieldingly opposing relative longitudinal movement of said friction elements.

4. In a friction shock absorbing mechanism, the combination with a casing having interior, longitudinally extending friction surfaces; of friction shoes having sliding contact with the friction surfaces of the casing, said shoes having a series of wedge faces on the inner sides along the length thereof; a helical coil spring embraced by said shoes, said spring having the coils thereof in wedging engagement with the wedge faces of said shoes and the coils thereof disposed between the faces of each of said series to hold said spring against lengthwise bodily movement with respect to said shoes; and means yieldingly opposing relative movement of the casing and shoes.

5. In a friction shock absorbing mechanism, the combination with a casing; of a friction unit within the casing having sliding frictional engagement with interior surfaces of the walls of said casing, said unit including a helical coil spring extending lengthwise of said unit, and friction shoes held against lateral separation by said casing and embracing said helical coil spring, said shoes having an interior helical groove, the walls of said helical groove engaging over the outer portions of the coils of said helical spring and holding said spring in distorted condition in lengthwise direction; and yielding means opposing relative movement of the casing and shoes.

6. In a friction shock absorbing mechanism, the combination with a friction casing; of a friction unit within said casing and slidable lengthwise of the same, said unit including a helical coil spring under lengthwise compression, and friction shoes enclosing said spring and having interior helical groove sections in which the outer portions of the coils of said helical spring are seated, said shoes being telescoped within the casing and held in frictional contact with the interior wall of said casing by wedging engagement of the coils of said compressed spring with the walls of the grooves of said shoes; and means yieldingly resisting relative movement of the casing and shoes.

7. In a friction shock absorbing mechanism, the combination with a friction casing; of opposed friction shoes within the casing, said shoes having exterior friction surfaces in engagement with the interior of the casing, said shoes having interior, spaced groove elements, the groove elements of the opposed shoes together defining a helical groove; a helical spring coil between said shoes and embraced thereby, said spring being tensioned in lengthwise direction and having the outer sides of the coils thereof seated in said helical groove; and means yieldingly opposing relative movement of the shoes and casing.

8. In a friction shock absorbing mechanism, the combination with a cylindrical casing having interior, longitudinally disposed friction surfaces, said casing having an exterior abutment flange at one end thereof and being open at the other end; of opposed elongated shoes telescoped within the open end of the casing, said shoes having flanges at the outer ends thereof, said shoes having interior spaced grooves thereon, said grooves on each shoe being arranged in series lengthwise thereof, and each groove forming a part of the same helix, all of said grooves of said shoes together forming a continuous, complete helix; a coiled helical spring distorted in lengthwise direction embraced by said shoes and having throughout its length the outer sides of the coil sections thereof seated in said grooves; and a spring surrounding said casing and shoes and having its opposite ends bearing respectively on the flange of the casing and the flanges of the shoes.

ARNOLD E. DENTLER.